United States Patent
Slone et al.

(10) Patent No.: US 7,452,935 B2
(45) Date of Patent: Nov. 18, 2008

(54) DURABLE TWO-PART POLYURETHANE FLOOR COATING

(75) Inventors: Caroline S. Slone, Ambler, PA (US); Theodore Tysak, Ambler, PA (US)

(73) Assignee: Rohm and Haas Company, Philadelphia, PA (US)

( * ) Notice: Subject to any disclaimer, the term of this patent is extended or adjusted under 35 U.S.C. 154(b) by 516 days.

(21) Appl. No.: 11/222,094

(22) Filed: Sep. 8, 2005

(65) Prior Publication Data

US 2006/0058447 A1    Mar. 16, 2006

Related U.S. Application Data

(60) Provisional application No. 60/608,778, filed on Sep. 10, 2004.

(51) Int. Cl.
*C08G 18/08*    (2006.01)
(52) U.S. Cl. .................................................... 524/507
(58) Field of Classification Search .................. 524/507
See application file for complete search history.

(56) References Cited

U.S. PATENT DOCUMENTS

| 5,075,370 | A | * | 12/1991 | Kubitza et al. .............. 524/591 |
| 5,308,912 | A | | 5/1994 | Margotte et al. |
| 5,508,340 | A | | 4/1996 | Hart |
| 5,614,584 | A | | 3/1997 | Schwan et al. |
| 5,670,600 | A | * | 9/1997 | Nienhaus et al. .............. 528/75 |
| 6,309,707 | B1 | | 10/2001 | Mayer et al. |
| 6,376,602 | B1 | * | 4/2002 | Probst et al. ................ 524/591 |

FOREIGN PATENT DOCUMENTS

| DE | 44 45 355 | 6/1996 |
| EP | 1 227 116 | 7/2002 |
| WO | WO 99/51658 | 10/1999 |
| WO | WO 01/98390 | 12/2001 |

* cited by examiner

*Primary Examiner*—Bernard Lipman
(74) *Attorney, Agent, or Firm*—Kenneth Crimaldi

(57) ABSTRACT

A two-component floor coating composition comprising: (a) an aqueous solution of a polyhydroxypolyacrylate having acid groups neutralized with a tertiary amine containing at least two hydroxy groups; said solution comprising an organic solvent; and (b) an aliphatic polyisocyanate.

18 Claims, No Drawings

DURABLE TWO-PART POLYURETHANE FLOOR COATING

CROSS REFERENCE TO RELATED PATENT APPLICATIONS

This is a non-provisional application of prior pending U.S. Provisional Application Ser. No. 60/608,778 filed on Sep. 10, 2004.

This invention relates to an aqueous, solvent-containing durable two-part polyurethane floor coating system.

Two-component aqueous, solvent-containing polyurethane coating systems have been disclosed in the prior art, see, e.g., U.S. Pat. No. 5,614,584. However, the coatings described in the prior art typically employ neutralizers for the acidic groups on the polyol component that make the coating unsuitable for use as a floor coating.

The problem addressed by the present invention is the need for an aqueous, solvent-containing two-part polyurethane floor coating system that produces a durable floor coating.

STATEMENT OF THE INVENTION

The present invention provides a two-component floor coating composition comprising: (a) an aqueous solution of a polyhydroxypolyacrylate having acid groups neutralized with a tertiary amine containing at least two hydroxy groups; said aqueous solution comprising an organic solvent; and (b) an aliphatic polyisocyanate.

The present invention further provides a method for coating a floor using the two-component floor coating composition.

DETAILED DESCRIPTION OF THE INVENTION

Percentages are weight percentages based on the entire composition, unless specified otherwise. As used herein the term "(meth)acrylic" refers to acrylic or methacrylic, and "(meth)acrylate" refers to acrylate or methacrylate. The term "acrylic polymers" refers to polymers of acrylic monomers, i.e., acrylic acid (AA), methacrylic acid (MAA) and their esters, and copolymers comprising at least 40% of acrylic monomers. Esters of AA and MAA include, but are not limited to, methyl methacrylate (MMA), ethyl methacrylate (EMA), butyl methacrylate (BMA), hydroxyethyl methacrylate (HEMA), methyl acrylate (MA), ethyl acrylate (EA), butyl acrylate (BA), hydroxyethyl acrylate (HEA), and hydroxypropyl acrylate (HPA), as well as other alkyl esters of AA or MAA. Preferably, acrylic polymers have at least 45% of monomer residues derived from (meth)acrylic acid or (meth)acrylate monomers, and most preferably at least 50%. The term "vinyl monomer" refers to a monomer suitable for addition polymerization and containing a single polymerizable carbon-carbon double bond. "Vinyl monomers" include, but are not limited to, acrylic monomers, styrene (STY) and alpha-methylstyrene (AMS).

An "acid-functional monomer" is a monoethylenically unsaturated monomer containing a carboxylic acid group. Suitable carboxylic acid monomers include monoethylenically unsaturated ($C_3$-$C_9$)carboxylic acid monomers, including monocarboxylic and dicarboxylic acids. For example, unsaturated monocarboxylic acids include acrylic acid, methacrylic acid, α-ethacrylic acid, β,β-dimethylacrylic acid, vinylacetic acid, allylacetic acid, ethylidineacetic acid, propylidineacetic acid, crotonic acid, acryloxypropionic acid and alkali and metal salts thereof. Suitable dicarboxylic acid monomers include, for example, maleic acid, maleic anhydride, fumaric acid, itaconic acid, citraconic acid, mesaconic acid, methylenemalonic acid and alkali and metal salts thereof. Other suitable acidic monoethylenically unsaturated monomers include the partial esters of unsaturated aliphatic dicarboxylic acids (alkyl half esters); for example, the alkyl half esters of itaconic acid, fumaric acid and maleic acid wherein the alkyl group contains 1 to 6 carbon atoms (methyl acid itaconate, butyl acid itaconate, ethyl acid fumarate, butyl acid fumarate and methyl acid maleate). Preferably, the monoethylenically unsaturated ($C_3$-$C_9$)carboxylic acid monomers are selected from one or more of acrylic acid and methacrylic acid.

A "hydroxy-functional monomer" is a monoethylenically unsaturated monomer containing a hydroxyl functional group. In one preferred embodiment, a hydroxy-functional monomer is a hydroxyalkyl (meth)acrylate. The hydroxyalkyl group contains at least one hydroxyl group. Examples of these include, among others, HEA, HEMA, HPA, HPMA (hydroxypropyl methacrylate) and HBA (hydroxybutyl acrylate). Another example of a hydroxy-functional monomer is a vinyl alcohol.

For the purposes of this invention, a tertiary amine containing at least two hydroxyl groups is used to neutralize acid groups in the polyol component of the coating composition. This compound has no primary or secondary amino groups. Preferred tertiary amine compounds include, e.g., trialkanolamines, alkyldialkanolamines, and reaction products of secondary diamines with alkylene oxides. Examples of trialkanolamines include triethanolamine and triisopropanolamine. Examples of alkyldialkanolamines include alkyldiethanolamines (e.g., methyldiethanolamine (MDEA)) and alkyldiisopropanolamines. Preferably, the alkyl group in an alkyldialkanolamine is a $C_1$-$C_4$ unsubstituted alkyl group. Examples of reaction products of secondary diamines with alkylene oxides include 1,4-bis(2-hydroxyethyl)piperazine. Preferably, the coating composition is substantially free of primary and secondary amines.

The polyol component of the coating composition comprises an aqueous polyhydroxypolyacrylate, i.e., an acrylic polymer having hydroxyl functionality. Preferably, the polymer comprises at least 30% of monomer units derived from hydroxy-functional monomers, more preferably at least 35%, and most preferably at least 40%. Preferably, the polymer has no more than 80% of monomer units derived from hydroxy-functional monomers, more preferably no more than 60%. Preferably, the polymer comprises no more than 10% of monomer units derived from acid-functional monomers, more preferably no more than 9%. Preferably, the polymer comprises at least 5% of monomer units derived from acid-functional monomers, more preferably at least 7%. In one embodiment of the invention, the polymer comprises at least 20% of monomer units derived from styrene or alpha-methylstyrene, more preferably at least 30%; preferably the polymer contains no more than 60% of monomer units derived from styrene or alpha-methylstyrene, and more preferably no more than 50%. Preferably, the polymer comprises monomer units derived from styrene.

Preferably, the polyhydroxypolyacrylate is made by solution polymerization. Preferred solvents for solution polymerization include glycol ethers and carbonates. Examples of these solvents include di(propylene glycol) monomethylether, di(propylene glycol) dimethyl ether, di(propylene glycol), propylene glycol, di(ethylene glycol), ethylene glycol, di(ethylene glycol) diethylether, di(ethylene glycol) dimethyl ether, ethylene glycol monoethyl ether, ethylene glycol monobutyl ether, di(ethylene glycol) monoethyl ether, di(ethylene glycol) monobutyl ether, ethylene carbonate, propylene carbonate and diethyl carbonate. Di(propylene glycol) monomethylether (available from Dow Corp. under the name Dowanol™ DPM) is especially preferred. The solution of polyhydroxypolyacrylate obtained from the solution polymerization is combined with the tertiary amine containing at least two hydroxyl groups to neutralize the acid functional groups on the polymer, and other ingredients are added to produce the polyol component of the coating composition. The other ingredients include surfactant (e.g., fluoro surfactants), defoamer (e.g., silicone-based defoamer) and water. Preferably, the organic solvent is present in an amount no more than 25% in the final aqueous polyhydroxypolyacrylate solution, and preferably there is at least 2% organic solvent in the final aqueous polyhydroxypolyacrylate solution.

Preferably, the number-average molecular weight of the polyhydroxypolyacrylate, measured by gel permeation chromatography, is no greater than 20,000, more preferably no greater than 10,000, and most preferably no greater than 5,000. Preferably, $M_n$ for the polyhydroxypolyacrylate is at least 500, and most preferably at least 1,000.

The polyol and isocyanate components of the coating composition are mixed before use to form a dispersion of the isocyanate in the polyol component. Preferably, the resulting mixture is applied to the floor within 2 hours. Preferred isocyanates are aliphatic isocyanates that are soluble or dispersible in water. Particularly preferred are hydrophilically-modified polymeric isocyanates formed from hexamethylene diisocyanate (HDI), e.g., those with an isocyanate equivalent weight from 200 to 320. Hydrophilically-modified polymeric isocyanates can be made from hydrophilic polyols or by incorporation of acidic or charged functional groups. Commercial examples of such hydrophilically-modified polymeric isocyanates based on HDI are Bayhydur™ 302 and Bayhydur™ XP-7148, available from Bayer Corp.

EXAMPLES

Preparation of Polyhydroxypolyacrylate Resins

The polymerization solvent (Dowanol™ DPM) was charged into the reaction flask and heated above 70° C. An initiator charge (0.3 weight percent based on monomer) and monomer charge (5% of monomer mix) were added to the reaction flask and heated to 160° C. The monomer and initiator feeds were started after 15 minutes and added over 3 hr. Residual monomer levels reduced with additional initiator. The polymer was cooled to 75° C. and the aqueous neutralizer was added. MDEA is methyldiethanolamine and DMEA is N,N-dimethyl-2-ethanolamine. The aqueous polymer solution was held at 50° C. for 15-20 minutes before being cooled down to room temperature.

Samples were prepared for gel permeation chromatography in tetrahydrofuran (Fisher Scientific Co., certified grade, stabilized) and polymer solutions were filtered using 0.45 μm filter. Separations were carried out on a liquid chromatograph consisting of an Agilent™ 1100 Model isocratic pump (Waldbronn, Germany), a Gilson™ 234 Model autoinjector (Villiers le Bel, France), an Eppendorf™ CH-430 Model column oven (Madison, Wis.) and Waters™ 410 Model differential refractometer (Milford, Mass.) both operated at 40° C. System control, data acquisition, and data processing were performed using version 2.0 of Cirrus® software (Polymer Laboratories, Church Stretton, UK). SEC separations were performed in THF (certified grade)@ 1 ml/min using SEC column set composed of three PLgel columns (300×7.5mm ID) packed with polystyrene-divinylbenzene gel (pore size marked as 100 Å, $10^3$ Å and $10^4$ Å, particle size 5 μm) purchased from Polymer Laboratories (Church Stretton, UK). 100 μL of sample solution with concentration C=2 mg/mL was subjected for SEC separation. "Apparent" molecular weights of analyzed samples were calculated using sample GPC chart and calibration curve of PS standards ($3^{rd}$ order fit).

TABLE 1

| | Example 1-6 | | | | | |
|---|---|---|---|---|---|---|
| | 1 | 2 | 3 | 4 | 5 | 6 |
| Dowanol ® DPM Monomer mix | 287.2 | 287.1 | 287.0 | 287.4 | 287.1 | 287.1 |
| Dowanol ® DPM | 8.3 | 8.3 | 0.3 | 8.1 | 8.1 | 8.4 |
| Sty | 215.3 | 215.3 | 215.3 | 215.3 | 215.3 | 215.3 |
| AA | 41.0 | 41.0 | 41.1 | 41.1 | 41.1 | 41.0 |
| HEMA | 256.4 | 256.4 | 256.4 | 256.4 | 256.4 | 256.4 |
| Initiator charge | | | | | | |
| di-t-butylperoxide | 25.3 | 25.4 | 25.4 | 25.34 | 25.3 | 25.3 |
| Dowanol ® DPM | 25.1 | 25.1 | 25.2 | 25.1 | 25.4 | 25.1 |
| Initiator chase | | | | | | |
| di-t-butylperoxide | 4.2 | 4.2 | 4.2 | 4.2 | 4.2 | 4.3 |
| Dowanol ® DPM | 20.1 | 20.1 | 20.2 | 20.1 | 20.1 | 20.1 |
| Neutralizer | | | | | | |
| KOH | 29.6 | | | | | |
| Ammonia | | 34.8 | | | | |
| Triethylamine | | | 57.6 | | | |
| DMEA | | | | 50.7 | | |
| MDEA | | | | | 67.9 | |
| triethanolamine | | | | | | 85.2 |
| Water | 752.7 | 620.4 | 603.0 | 601.8 | 580.0 | 580.9 |
| % solids | 32.9 | 33.7 | 34.3 | 34.2 | 34.5 | 34.3 |
| $M_n$ | 2239 | 2100 | 2618 | 2517 | 2243 | 1966 |

TABLE 2

| | Example 7-10 | | | |
|---|---|---|---|---|
| | 7 | 8 | 9 | 10 |
| Dowanol ® DPM Monomer mix | 287.1 | 287.2 | 287.1 | 287.3 |
| Dowanol ® DPM | 8.1 | 8.2 | 8.1 | 8.1 |
| Sty | 215.4 | 215.4 | 215.3 | 215.4 |
| AA | 41.0 | 41.0 | 41.0 | 41.1 |
| HPA | 256.4 | 256.4 | 256.4 | 256.4 |
| Initiator charge | | | | |
| di-t-butylperoxide | 25.3 | 25.3 | 25.4 | 25.5 |
| Dowanol ® DPM | 25.1 | 25.3 | 25.0 | 25.2 |
| Initiator chase | | | | |
| di-t-butylperoxide | 4.2 | 4.3 | 4.2 | 4.3 |
| Dowanol ® DPM | 20.3 | 20.2 | 20.1 | 20.2 |
| Neutralizer | | | | |
| KOH | 31.0 | | | |
| Ammonia (28%) | | 35.0 | | |
| Triethylamine | | | 57.8 | |
| triethanolamine | | | | 85.2 |
| Water | 690.2 | 620.0 | 592.1 | 580.1 |
| % solids | 33.7 | 34.3 | 33.8 | 34.1 |
| $M_n$ | 2618 | 3234 | 3124 | 2782 |

TABLE 3

Example 11-14

| | 11 | 12 | 13 | 14 |
|---|---|---|---|---|
| Dowanol ® DPM | 287.6 | 287.2 | 287.2 | 287.2 |
| Monomer mix | | | | |
| Dowanol ® DPM | 8.1 | 13.1 | 13.0 | 8.1 |
| Sty | 138.4 | 189.7 | 215.3 | 241.0 |
| AA | 41.0 | 41.0 | 41.0 | 41.0 |
| BA | 76.9 | 76.9 | 76.9 | 76.9 |
| HEMA | 256.4 | 205.1 | 179.5 | 53.9 |
| Initiator charge | | | | |
| di-t-butylperoxide | 25.4 | | | 25.4 |
| di-t-amylperoxide | | 30.3 | 30.2 | |
| Dowanol ® DPM | 25.1 | 20.1 | 20.0 | 25.0 |
| Initiator chase | | | | |
| di-t-butylperoxide | 4.2 | | | 4.2 |
| di-t-amylperoxide | | 5.1 | 5.0 | |
| Dowanol ® DPM | 20.1 | 20.1 | 20.0 | 20.1 |
| Neutralizer | | | | |
| triethanolamine | 85.1 | 86.8 | 85.0 | 85.1 |
| water | 580.1 | 580.0 | 580.0 | 580.0 |
| % solids | 34.5 | 33.5 | 33.9 | 34.9 |
| $M_n$ | 2584 | 2726 | 2961 | 3264 |

TABLE 4

Example 15-18

| | 15 | 16 | 17 | 18 |
|---|---|---|---|---|
| Dowanol ® DPM | 287.1 | 287.1 | 287.1 | 287.2 |
| Monomer mix | | | | |
| Dowanol ® DPM | 8.4 | 8.1 | 8.5 | 8.2 |
| Sty | 215.3 | 205.0 | 179.4 | 128.2 |
| AA | 41.0 | 51.3 | 76.9 | 128.3 |
| HEMA | 256.4 | 256.4 | 256.4 | 256.5 |
| Initiator charge | | | | |
| di-t-butylperoxide | 25.3 | 25.3 | 25.3 | 25.3 |
| Dowanol ® DPM | 25.1 | 25.1 | 25.7 | 25.1 |
| Initiator chase | | | | |
| di-t-butylperoxide | 4.3 | 4.2 | 4.2 | 4.2 |
| Dowanol ® DPM | 20.1 | 20.0 | 20.2 | 20.1 |
| Neutralizer | | | | |
| triethanolamine | 85.2 | 107.2 | 160.3 | 266.2 |
| Water | 580.1 | 543.3 | 502.8 | 400.3 |
| % solids | 34.3 | 35.6 | 36.1 | 43.3 |
| $M_n$ | 1966 | 2785 | 2171 | 1548 |

Preparation of 2-Part Clear Coatings

Part A of the 2-part clear coatings consisted of an aliphatic polyisocyanate that was 100% solids. Examples of suitable polyisocyanates include Bayhydur™ 302 and Bayhydur™ XP-4178 from Bayer.

Part B solutions were prepared by adding the polyhydroxypolyacrylate resins in Examples 1-19 to an aqueous solution containing 0.05 parts Byk™ 340 defoamer and 0.01 parts Byk™ 025 fluorosurfactant wetting aid, both are additives sold by Byk Chemie. The solids level of the Part B solution was adjusted to obtain a 35% total solids level for the coating.

Parts A and B were mixed for 10 minutes using an overhead mixer and coatings of a thickness of 6 mils (wet) were drawn down onto vinyl composite floor tiles. Film performance data are given in Tables 5 to 8. Gloss measurements were taken after the films were allowed to dry for 24 hours. The method for determining the gloss is described in "Annual Book of ASTM Standards," Section 15, Volume 15.04, Test Procedure ASTM D 1455 (2000). A Gardner Byk Micro-Tri-Gloss meter, catalog number 4520, was used to record 60° and 20° gloss. Water resistance was evaluated after the films were tack-free and after 1 day. The method for determining the water resistance is described in "Annual Book of ASTM Standards," Section 15, Volume 15.04, Test Procedure ASTM D 1793 (2000). The following ratings were applied to the films after being exposed to a water drop for 1 hour and wiped off: Ex=no effect, TrWh=Trace whitening, Wh=whitening, Hwh=heavy whitening, Bl=blisters. Pencil hardness data presented in Tables 5-8 were measured using ASTM D-3363 (2000) from the Annual Book of Standards, Volume 06.01. Tack time was measured using the Zapon Tack Tester to measure surface tack and rate of drying. A coat of 4.0 mils of test polish is applied to the surface of the tile and allowed to sit until apparent dryness (when the polish film appears dry). At this point, the tack tester {A piece of aluminum $\frac{1}{16}$ inch thick (1.6 mm), 1 inch (2.54 cm) wide and 3.25 inches (8.3 cm) long is bent at an angle so that a 1 in$^2$ area may be set on the surface of the polish film. The angle of the bend is determined such that the tester will just balance when a 5 g weight is placed on the 1 in$^2$ surface on a dry flat substrate} is placed on the polish film (1 in$^2$ surface (6.5 cm$^2$)). A 500 g weight is placed on the tack tester's 1 in$^2$ surface and allowed to sit for five seconds and then removed. If more than five seconds are required for the tester's foot to pull completely away from the polish film, the surface is considered not to be tack-free, and the test is repeated in one-minute intervals until the tack-free time is determined. The value is recorded in minutes from application time. Gel time was taken as the time required for the polish formulation to become a non-flowable gel.

TABLE 5

42Sty/8AA/50HEMA + Bayhydur™ 302

| resin | neutralizer | film appearance | gloss 20°/60° | gel time (hr) | tack time (hr) | water resistance (tack/ 1 d) | pencil hardness (1 d/ 7 d) |
|---|---|---|---|---|---|---|---|
| 1 | KOH | heavy foam | 27/64 | 1.3 | 2 | Wh/wh | B/HB |
| 2 | triethylamine | hazy, foam in thick parts | 21/58 | 2 | 5 | Wh/ex | F/H |
| 3 | ammonia | clear* | 31/70 | 1.5 | 5.5 | TrWh/ ex | B/F |
| 4 | DMAE | hazy, some foam | 18/49 | 2.5 | 4.5 | HWh/ TrWh | B/HB |
| 5 | MDEA | clear | 44/74 | 2 | 4.5 | HWh/ TrWh | B/HB |
| 6 | triethanolamine | clear | 75/92 | 1.2 | 5.5 | Ex/ex | 2B/HB |

*large amounts of foam observed upon gellation

TABLE 6

42Sty/8AA/50HPA + Bayhydur™ 302

| resin | neutralizer | film appearance | gloss 20°/60° | gel time (hr) | tack time (hr) | water resistance (tack/ 1 d) | pencil hardness (1 d/ 7 d) |
|---|---|---|---|---|---|---|---|
| 7 | KOH | foam in thick parts | 28/65 | 1.5 | 2.5 | HWh/ Wh | 5B/3B |
| 8 | triethylamine | hazy, some foam | 15/51 | 2.3 | >6.5 | TrWh/ ex | B/F |

TABLE 6-continued

42Sty/8AA/50HPA + Bayhydur ™ 302

| resin | neutralizer | film appearance | gloss 20°/60° | gel time (hr) | tack time (hr) | water resistance (tack/1 d) | pencil hardness (1 d/7 d) |
|---|---|---|---|---|---|---|---|
| 9 | ammonia | clear* | 36/73 | 1.3 | >7.5 | TrWh/ex | HB/F |
| 10 | triethanolamine | clear | 49/78 | 3.5 | 7 | Ex/ex | HB/HB |

*large amounts of foam observed upon gellation

TABLE 7

Compositions with Varied HEMA Levels + Bayhydur ™ XP-7148

| resin | Percent HEMA | film appearance | gloss 20°/60° | gel time (hr) | tack time (hr) | water resistance (tack/1 d) | pencil hardness (1 d/7 d) |
|---|---|---|---|---|---|---|---|
| 11 | 50 | clear | 73/91 | 1.5 | 6 | TrWh/ex | B/HB |
| 12 | 40 | clear | 78/92 | 1.8 | 6.5 | TrWh/TrWh | 3B/B |
| 13 | 35 | clear | 78/90 | 2 | 5.8 | TrWh/TrWh | 3B/HB |
| 14 | 30 | clear | 77/89 | 2.3 | 5.5 | TrWh/TrWh | 4B/3B |

TABLE 8

Compositions with Varied AA Levels + Bayhydur XP-7148

| resin | Percent AA | film appearance | gloss 20°/60° | gel time (hr) | tack time (hr) | water resistance (tack/1 d) | pencil hardness (1 d/7 d) |
|---|---|---|---|---|---|---|---|
| 15 | 8 | clear | 75/92 | 1.2 | 5.5 | Ex/ex | 2B/HB |
| 16 | 10 | clear | 81/89 | 1.8 | 6.8 | TrWh/TrWh | HB/HB |
| 17 | 15 | clear | 51/80 | 2.5 | 5.5 | WhBl/WhBl | 2B/HB |
| 18 | 25 | hazy | 4/23 | 1.2 | >7 | WhBl/WhBl | 6B+/5B |

The invention claimed is:

1. A two-component floor coating composition comprising:
  (a) an aqueous solution of a polyhydroxypolyacrylate having acid groups; said solution comprising an organic solvent; and
  (b) an aliphatic polyisocyanate which is soluble or dispersible in water;
  wherein the polyhydroxypolyacrylate comprises at least 30% of monomer units derived from hydroxy-functional monomers and no more than 10% of monomer units derived from acid-functional monomers; and wherein the acid groups in the polyhydiroxypolyacrylate are neutralized with a trialkanolamine, a $C_1$-$C_4$ unsubstituted alkyl dialkanolamine, or a reaction product of a secondary diamine with an alkylene oxide.

2. A method of coating a floor; said method comprising applying the two-component floor coating composition of claim 1.

3. The method of claim 2 in which said polyhydroxypolyacrylate is prepared via solution polymerization and has a number average molecular weight no greater than 10,000.

4. The composition of claim 1 in which the polyhydroxypolyacrylate comprises at least 40% of monomer units derived from hydroxy-functional monomers.

5. The composition of claim 4 in which the polyhydroxypolyacrylate comprises no more than 60% of monomer units derived from hydroxy-functional monomers.

6. The composition of claim 5 in which the acid groups in the polyhydroxypolyacrylate are neutralized with a trialkanolamine or a $C_1$-$C_4$ unsubstituted alkyl dialkanolamine.

7. The composition of claim 6 in which the polyhydroxypolyacrylate comprises at least 7% of monomer units derived from acid-functional monomers and no more than 9% of monomer units derived from acid-functional monomers.

8. The composition of claim 7 in which said hydroxy-functional monomers are selected from the group consisting of hydroxyethyl acrylate, hydroxyethyl methacrylate, hydroxypropyl acrylate and hydroxypropyl methacrylate.

9. The composition of claim 8 in which said acid-functional monomers are selected from the group consisting of acrylic acid and methacrylic acid.

10. The composition of claim 9 in which the polyhydroxypolyacrylate comprises at least 30% of monomer units derived from styrene or alpha-methylstyrene and no more than 50% of monomer units derived from styrene or alpha-methylstyrene.

11. The method of claim 3 in which the polyhydroxypolyacrylate comprises at least 40% of monomer units derived from hydroxy-functional monomers.

12. The method of claim 11 in which the polyhydroxypolyacrylate comprises no more than 60% of monomer units derived from hydroxy-functional monomers.

13. The method of claim 12 in which the acid groups in the palyhydroxypolyacrylate are neutralized with a trialkanolamine or a $C_1$-$C_4$ unsubstituted alkyl dialkanolaminne.

14. The method of claim 13 in which the polyhydroxypolyacrylate comprises at least 7% of monomer units derived from acid-functional monomers and no more than 9% of monomer units derived from acid-functional monomers.

15. The method of claim 14 in which said hydroxy-functional monomers are selected from the group consisting of hydroxyethyl acrylate, hydroxyethyl methacrylate, hydroxypropyl acrylate and hydroxypropyl methacrylate.

16. The method of claim 15 in which said acid-functional monomers are selected from the group consisting of acrylic acid and methacrylic acid.

17. The method of claim 16 in which the polyhydroxypolyacrylate comprises at least 30% of monomer units derived from styrene or alpha-methylstyrene and no more than 50% of monomer units derived from styrene or alpha-methylstyrene.

18. The method of claim 17 in which the aliphatic polyisocyanate has an isocyanate equivalent weight from 200 to 320.

* * * * *